(No Model.)
C. A. KINNEY.
LAMP HANGER.
No. 336,326. Patented Feb. 16, 1886.
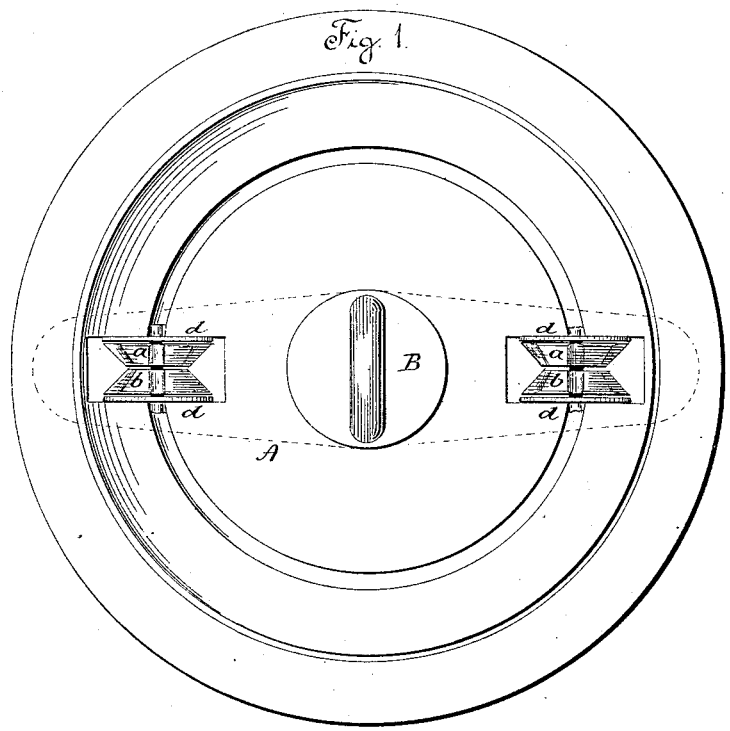
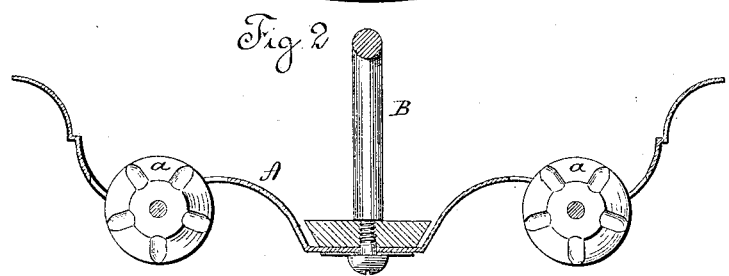
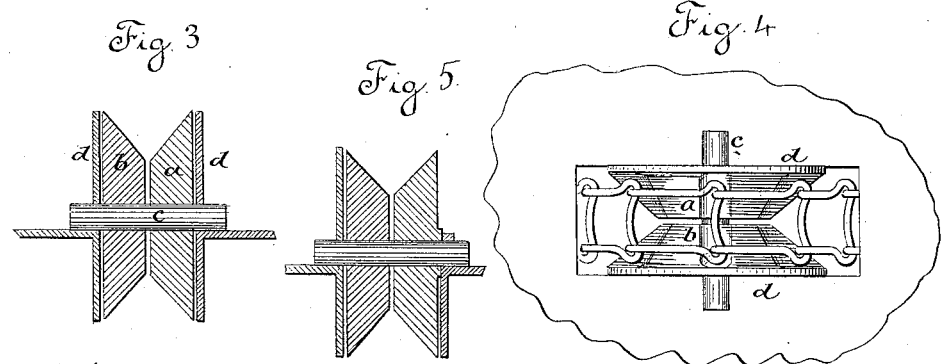
Witnesses.
J. H. Shumway
Fred C. Earle
Chas. A. Kinney
Inventor.
By Atty
John C. Earle

UNITED STATES PATENT OFFICE.

CHARLES A. KINNEY, OF MERIDEN, CONNECTICUT, ASSIGNOR TO EDWARD MILLER & CO., OF SAME PLACE.

LAMP-HANGER.

SPECIFICATION forming part of Letters Patent No. 336,326, dated February 16, 1886.

Application filed August 31, 1885. Serial No. 175,694. (No model.)

*To all whom it may concern:*

Be it known that I, CHARLES A. KINNEY, of Meriden, in the county of New Haven and State of Connecticut, have invented new Improvements in Lamp-Hangers; and I do hereby declare the following, when taken in connection with accompanying drawings and the letters of reference marked thereon, to be a full, clear, and exact description of the same, and which said drawings constitute part of this specification, and represent, in—

Figure 1, a top view of the hanger, showing the pulleys; Fig. 2, a vertical central section cutting through the pulleys at right angles to their axis; Fig. 3, a vertical central section through one pulley parallel with the axis, enlarged; Fig. 4, a top view of one of the pulleys, enlarged; Fig. 5, a modification.

This invention relates to an improvement in hangers for that class of lamps which are made adjustable to different elevations, and which are suspended by chains from a hanger carrying pulleys, over which the chains run either to a spring above or weights upon the end of the chain. The weight or lifting device for such hanger is a constant power. The lamp-holder or thing suspended varies to a considerable extent, owing to different constructions of the holder, different weights of fount or shade. The weight, being constant, can only counterbalance a weight substantially its own; hence, if there be considerable variation in the weight of the thing suspended, either the counterbalancing-weight will be too great or too little, and so that the points of rest will only be at one extreme or the other, and the desirable adjustment for different elevations cannot be attained. To avoid this difficulty, frictional devices have been applied to the pulleys to create a friction upon the pulley to so considerable an extent that the variation in the weight between the thing suspended and the counterbalancing-weight would not overcome the friction, and so that the thing suspended would rest at any desired point at which it might be set.

It is to such frictional devices that my invention particularly relates; and the invention consists in constructing the pulley or pulleys over which the chain or chains work in two parts, each part being of frustum-of-cone shape, the smaller diameters meeting, and so as to produce a groove in the pulley of substantially V shape, combined with cheeks in the holder, between which said pulleys are arranged, and so that a force applied by the chain in the V-shaped groove will tend to spread the two parts and force them against their respective cheeks, to create friction upon the pulley, and as more fully hereinafter described.

A represents the canopy of the hanger, which is provided with the usual eye, B, by which it may be suspended. The canopy may be of any desirable shape or design; or it may be simply a bar adapted to support the carrying-pulleys—a common and well known construction. The pulleys, as here represented, are two in number, diametrically opposite each other. Each pulley is composed of two parts, *a b*, each part of substantially frustum-of-cone shape, one or both loose upon the axle *c*, the axle resting in suitable bearings in the hanger, and so that the parts of the pulley may freely revolve, the two parts of the pulley arranged with their smaller diameter inward, and so that the two parts produce substantially a V-shaped groove around the pulley. In the hanger, at each side of the pulley, a cheek, *d*, is arranged, the plane of which is parallel with the plane of the pulley, and as clearly seen in Fig. 3. The chain runs over the pulleys in the usual manner, and, bearing between the parts under the force of the weight, will tend to separate the two parts of the pulleys and force them toward their respective cheeks, and as indicated in Fig. 4, so that each part comes into strong frictional contact with the said cheeks, and, rubbing thereon, the friction offers a resistance to the revolution of the pulleys. This friction is sufficient to counteract a very considerable difference between the weight and the thing suspended, so that in drawing down the thing suspended the friction is applied to resist such drawing down; but on the lifting of the thing suspended the friction will be relieved to a very considerable extent, and allow the pulleys to run more freely, so that there will be less resistance to the ascent than to the descent, thus overcoming difficulties in a constant-applied friction where the same resistance is offered to the running of the pulleys in both directions. Preferably the face of the parts of the pulley are grooved to engage links, as seen in Fig. 4, the links there shown being common and well-known constructions for lamp-chains.

I have stated that the hanger may be in the form of a canopy or in the shape of a bar. Such bar shape is indicated by the broken line, Fig. 1.

While the invention is designed with special reference to lamp-hangers, it will be understood that it may be used for suspending other articles, as a bird-cage, for illustration. Therefore, while terming the invention "lamp-hanger," I do not wish to be understood as confining it to that special purpose.

While I prefer to make both parts of the pulley free for longitudinal movement, and combine with each part a corresponding cheek, $d$, one of the said parts—say $b$—only may be free for longitudinal movement, the other part prevented from such movement, as indicated in Fig. 5. In that case a cheek only for that one part $b$ will be required, as shown in that figure.

I claim—

In a lamp-hanger, one or more pulleys adapted to carry the suspending-chains, and constructed in two parts, each part of substantially frustum-of cone shape, the smaller diameter toward each other to form a groove around the pulley adapted to receive the suspending-chain, one or both the parts loose upon the axle and free for movement in an axial direction, combined with corresponding cheeks parallel with and adjacent to the outer side of the movable part or parts, and against which said part or parts may be forced, substantially as described.

CHAS. A. KINNEY.

Witnesses:
BENJ. C. KENNARD,
FREDK. S. WILLIAMS.